United States Patent

[11] 3,615,243

[72] Inventor Clarence W. Scott
　　435 N. Highland #3, Memphis, Tenn. 38122
[21] Appl. No. 827,001
[22] Filed May 22, 1969
[45] Patented Oct. 26, 1971

[54] APPARATUS FOR EXTRACTING LIQUID FROM A MOBILE SEMISOLID CELLULAR SYSTEM
5 Claims, 8 Drawing Figs.

[52] U.S. Cl.................................................... 23/267,
　　23/270, 62/58, 23/273, 259/8, 259/44
[51] Int. Cl........................................................B01d 11/02,
　　B01d 9/04, B01f 5/26
[50] Field of Search.......................................... 23/267,
　　270.5, 270, 310, 273; 259/8, 43, 45, 23, 24, 44;
　　62/58

[56]　　　　　　References Cited
　　　　　　UNITED STATES PATENTS
2,626,786　1/1953　McGlothin.................... 23/273 X
2,800,411　7/1957　Church........................... 23/273 X
2,813,851　11/1957　McKay.......................... 23/273 X
2,828,230　3/1958　Heinrich........................ 23/270 X
2,857,907　10/1958　Kaether........................ 23/270 X
2,927,007　3/1960　Kaether........................ 23/270
3,111,393　11/1963　Cavanagh..................... 23/270 X
3,155,697　11/1964　Jurgen-Lothmann........ 23/270 X
3,319,937　5/1967　Wilson........................... 259/38
3,321,283　5/1967　Ewald............................ 259/8 X
3,467,576　9/1969　Clark............................. 23/270 X
3,487,822　12/1969　Krizak.......................... 259/8

Primary Examiner—Wilbur L. Bascomb, Jr.
Assistant Examiner—S. J. Emery
Attorney—John R. Walker, III ABSTRACT: Apparatus for separating or extracting liquid phase substances from gel phase substances in a semisolid mobile cellular system wherein there exists a substantial difference in density between the liquid and gel phase substances of the system. The apparatus is particularly useful for separating or deliquoring black liquor soap substances manufactured in a chemical pulping operation. The apparatus, in a preferred form, includes a long tall cylindrical vessel or tank, a vertical rotor mounted on the vertical center axis of the tank interior having a series of press rods radially fixed cantilever fashion on the rotor shaft and projecting toward the cylindrical interior tank wall, a second series of press rods generally cantilever fixed to the tank wall interior and projecting radially toward the rotor axis and alternatingly arranged with the movable radially extending rotor press rods. The semisolid cellular soap substance or the like is pumped into the tank and the rotor driven at a slow speed (3-5 r.p.m.) to cause the cellular substance to be squeezed between the alternatingly arranged fixed and movable press rods. This causes the liquid phase substance to collect on the trailing side of each of the press rods and the liquid to be conducted to a liquid pool formed either at the upper or lower elevation of the tank depending on whether the liquid phase substance is heavier or lighter than the gel phase substance in the semisolid cellular system being processed.

PATENTED OCT 26 1971 3,615,243

INVENTOR.
CLARENCE W. SCOTT
BY John R. Walker III
Attorney

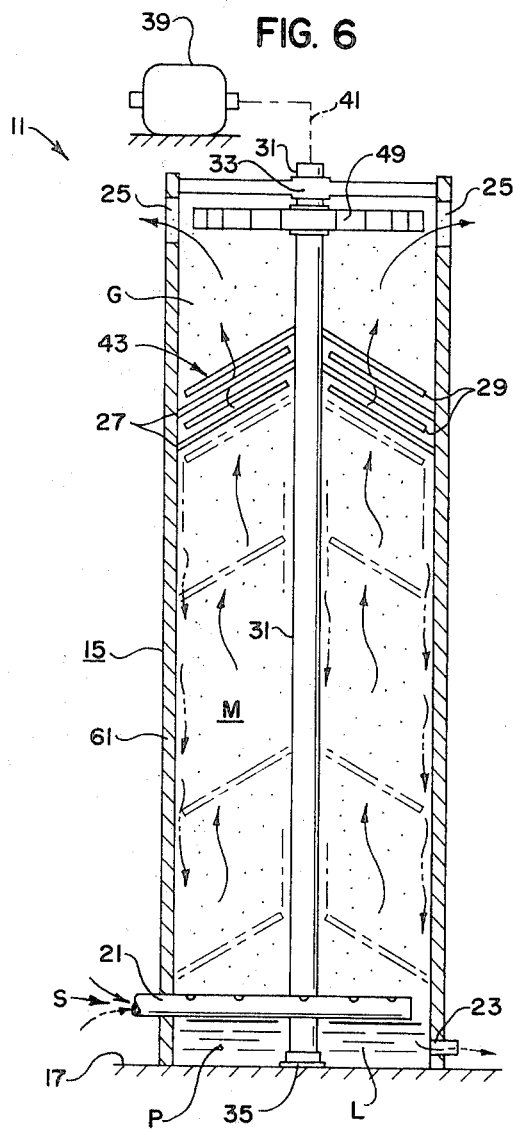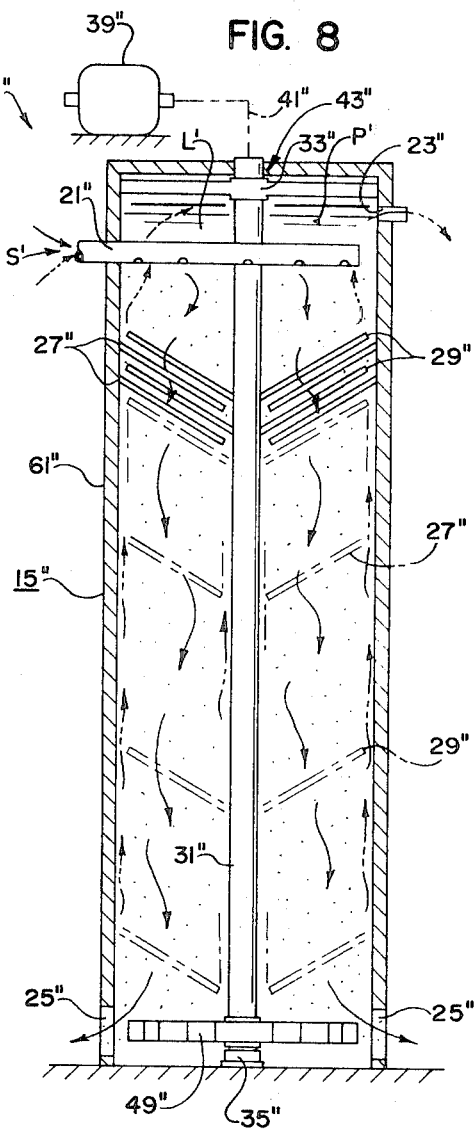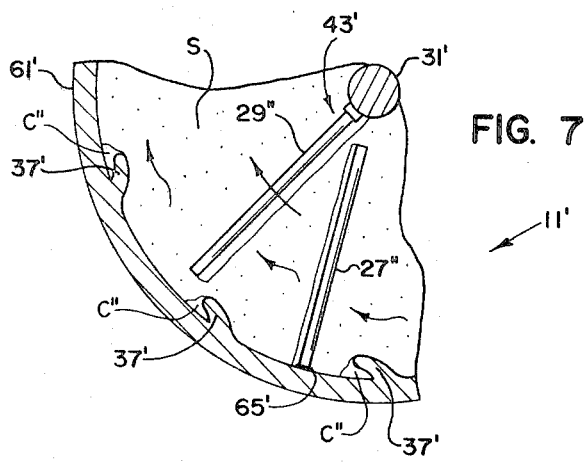

APPARATUS FOR EXTRACTING LIQUID FROM A MOBILE SEMISOLID CELLULAR SYSTEM

BACKGROUND OF THE INVENTION

1. Field of the Invention

This invention relates to apparatus for extracting liquid phase substances from gel phase substances of a semisolid mobile cellular system. The invention relates to apparatus and processes utilized in recovery of black liquor soap from a pulping process; also, it relates to the apparatus and processes utilized in the manufacture of tall oil and in the manufacture of certain cellular substances in the category of soft greases.

2. Description of the Prior Art

The above-indicated field of the invention suggests its use in several chemical processing industries. However, for purposes of clarity in description, the apparatus and process of the invention will be described mainly as it relates to cellular black liquor soap substances recovered as a byproduct from kraft pulping liquors. The invention is primarily directed toward the provision of improved apparatus for reducing the black liquor content of black liquor soap thereby increasing the recovery of tall oil and reducing sewage or water pollution as well as air pollution. In the pulp-manufacturing industry, black liquor soap byproducts from pulping liquors typically are sold to other industries, as for example, the tall oil industry. The less black liquor in black liquor soap the higher the yield and thus the higher the market value of the soap. In certain manufacturing processes the black liquor soap is acidified with an acid and produces hydrogen sulfide which evolves into the atmosphere as an air pollution agent. The more black liquor which is removed from the cellular soap substance the less air pollution caused by hydrogen sulfide and other air pollution agents. The more black liquor removed from the cellular soap substance the less air pollution and also the less amount of oil is lost to sewage and such oil acting as a sewage or water pollution agent. This is particularly an important factor when the soap is processed in tall oil manufacturing plants.

Heretofore, the mechanical means utilized in removing the black liquor liquid substance from the cellular soap substance in a pulp-manufacturing plant has been accomplished by forcibly moving the cellular soap substance upwardly in a cylindrical tank including a rotating rotor bearing a multiplicity of vertical rods. The tank interior of the prior art structure also was provided with a plurality of stationary vertical rods which coacted with the rotating vertical rods for squeezing the cellular soap substance and conducting the black liquor substance vertically downwardly to a lower level of the tank where it was drained away. Such mechanical means for separation of black liquor from black liquor soap has not been entirely satisfactory. Heretofore, the typical operation removed only approximately 50 percent of the black liquor content in the soap which reduced the yield and thus the market value of the soap and also contributed to the water or sewage pollution problem as well as the air pollution problem.

Certain manufacturing installations also utilized chemical means for reducing the black liquor content in the soap by flushing or introducing a flushing or washing liquid in the tank as the cellular soap substance was rotatingly mechanically worked by the rotor structure of the prior art apparatus. The washing of the soap substance displaced the black liquor and moved downwardly through the cellular mass to be drained away with the black liquor. Washing the cellular soap substance in this manner is rather a stop gap practice acting as auxiliary means for ineffective mechanical separation of the liquid and gel phase substances of the black liquor soap substance. Also, in the mechanical separation of the liquid and gel phases of the cellular soap substance a considerable period of time was required for the process. Heretofore, approximately 3½ to 4½ hours residence time in the tank was required to separate the liquid from the gel substances depending on whether or not the soap was washed. Auxiliary means as washing for separating the liquid and gel phases decreased the residence time of the soap in the tank but utilized certain wash liquors which were valuable in other industrial processes pertinent to a particular manufacture.

SUMMARY OF THE INVENTION

The present invention reduces substantially the residence time of the cellular soap substance in the separating tank and to approximately one-half the time required in prior art practice. The apparatus of the present invention is more efficient in that it removes substantially 75 percent or more of the black liquor from the soap substance and without utilizing the chemical or washing agents for flushing or displacing the black liquor. In contrast to the vertical rods of the rotor mechanism of prior art structure, the rotor of the present invention utilizes a multiplicity of angular rods extending radially from the rotor shaft coacting with a multiplicity of fixed angular rods supported on or adjacent the tank wall interior. The fixed and movable rods intermingle for squeezing the cellular soap structure and for conducting the liquid content thereof radially outwardly to such a disposition whereat it flows downwardly and is collected in the lower level of the tank. Channellike voids are formed on the trailing side of each rod of the stationary and moving rotor rods of the apparatus and in such channel shaped areas of the cellular soap mass the liquid substance may drain to the lower levels of the tank.

Certain desirable features attributed to the apparatus of the present invention are of considerable pertinency to pulp manufacturing. Utilization of the process and apparatus of this invention may effectively bring about the following results:

1. A higher liquor removal action with an increased tall oil recovery efficiency by reducing to a minimum the tall oil losses associated with the acid precipitated gunk or lignin from the alkali-lignin in the black liquor spent cooking liquor with dissolved wood components including lignin. The oil loss of 3 percent due to absorption or association with the gunk is reduced to less than 1 percent.
2. Less atmospheric pollution by reducing the hydrogen sulfide evolved by reaction of mineral acid with the black liquor and its associated sulfides.
3. Reduces the necessity for washing or flushing the cellular soap substance but when used with a washing action reduces the black liquor content further and removes organic salts such as sodium formate, oxalate, acetate and lactates which on acidification are converted to water-soluble acids which have to be washed out of the soap substance. The removed salts remain in the liquor system to be burned rather than contributing to the air and water pollution problem of a manufacturing plant.
4. Allows spent acid from the soap-splitting operation to be neutralized by the alkalinity of the soap near the neutral point resulting in reducing the acid required in the splitting process.
5. Reduces the possibility of hydrogen sulfide evolution upon addition of incompletely neutralized spent acid to the heavy black liquor prior to it being returned and burned in the recovery furnace.
6. In tall oil manufacture, the phase separation between the lighter tall oil and water will be faster and more distinct thereby reducing the oil loss in waste to the sewer.
7. The apparatus and process of this invention may be effectively used with any cellular system wherein a significant density exists between the liquid and gel phases. When utilized in operation wherein the liquid phase is lighter than the gel phase, the system would function in downfeed countercurrent separation which is in contrast with the operation and processing black liquor soap wherein the gel phase is lighter in density than the liquor phase.

BRIEF DESCRIPTION OF THE DRAWING

FIGS. 1-6 illustrate the apparatus of the present invention functioning as in paper or pulp manufacturing and as being operative for removing or extracting heavier liquid phase elements, indicated L, from lighter gel phase elements, indicated G.

FIG. 1 is a somewhat schematic view of the deliquoring apparatus shown in conjunction with a typical chemical pulping system also shown schematically.

FIG. 2 is a horizontal plane sectional view of the deliquoring apparatus taken as on the line II—II of FIG. 1 but illustrating the rotor at a slightly turned disposition from that shown in FIG. 1.

FIG. 3 is a vertical plane fragmentary sectional view in half section of the deliquoring tank apparatus taken as from FIG. 1.

FIG. 4 is an oblique plane view taken as on the line IV—IV of FIG. 3 but showing also the cellular soap substance S.

FIG. 5 is a vertical plane sectional view taken as on the line v—V of FIG. 3.

FIG. 6 is a schematic view, similar to FIG. 1, but showing the deliquoring apparatus of the invention without the chemical pulping system.

FIG. 7 is a horizontal plane fragmentary sectional view of a modification, indicated 11', which may be utilized in either of the embodiments shown in FIGS. 6 and 8.

FIG. 8 is a schematic view similar to FIG. 6 but illustrating the deliquoring apparatus arranged in an inverted disposition for processing a semisolid cellular substance having a liquor component L' of lighter density than the gel component G'.

DESCRIPTION OF THE PREFERRED EMBODIMENTS

Figure 1:
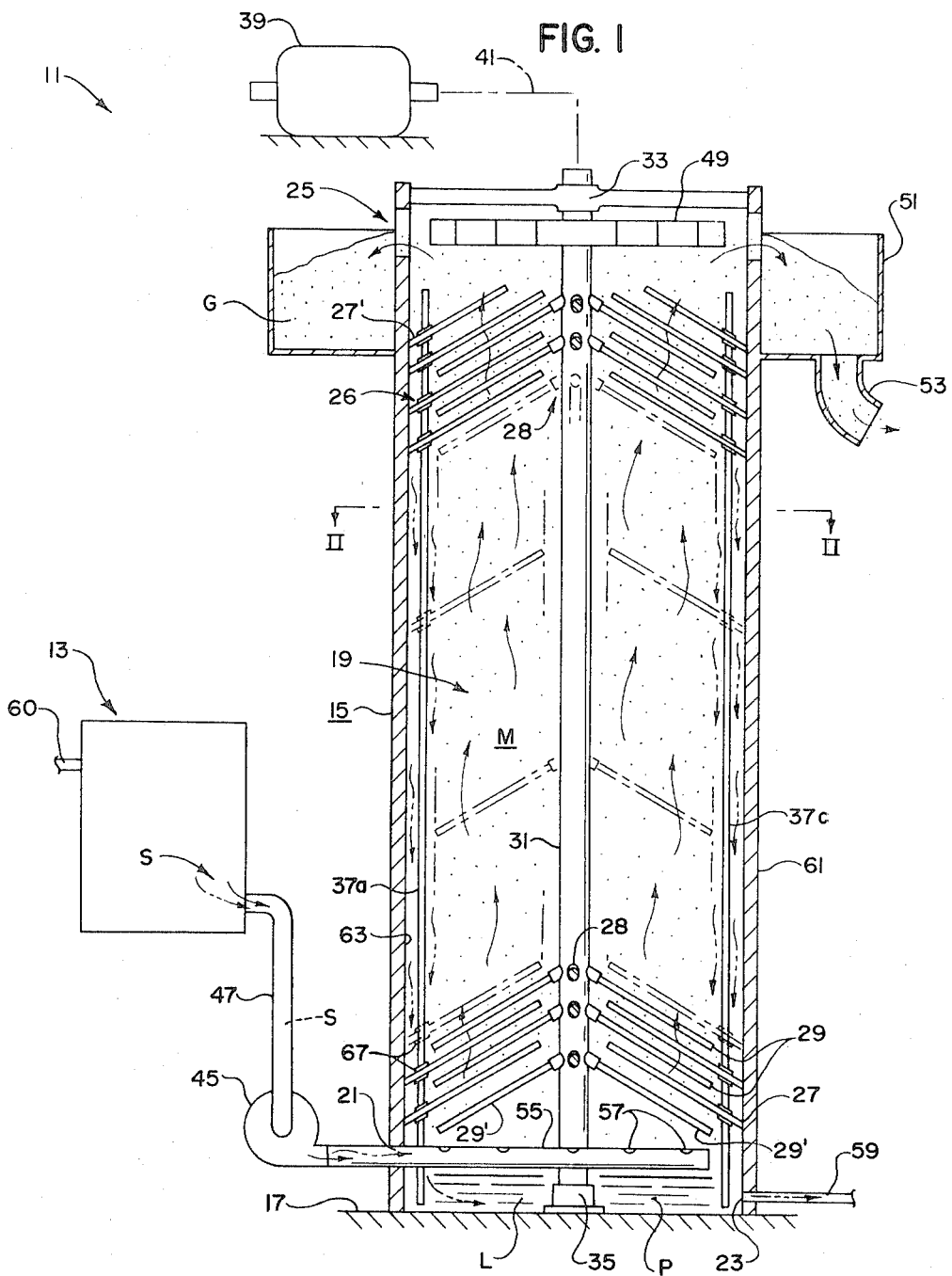

FIGS. 1–6 illustrate a form of the deliquoring apparatus, indicated by numeral 11, adapted for extracting a heavier liquid phase substance L from a lighter gel phase of the substance G which forms substantially the components of a semisolid mobile cellular substance S. In FIG. 1 the substance S is considered as being black liquor soap and the apparatus is shown in conjunction with a typical pulping system indicated by numeral 13.

The deliquoring apparatus 11 basically includes a tank structure 15 preferably cylindrical in form which may be supported on horizontal support structure 17; means for introducing the semisolid cellular substance S issuing from chemical pulping operation 13 into the cylindrical interior 19 of tank structure 15 including an entry opening 21 arranged at the lower portion of tank structure 15 and including a liquid substance exit opening 23 and gel substance exit opening 25 arranged respectively at the lower and upper elevations of the tank structure; the deliquoring apparatus includes means for accelerating the rate of separation of the liquid and gel phase substances of the cellular mass M in the interior of tank 15 and includes a multiplicity of primary and secondary radially arranged press rods, generally indicated respectively by numerals 27 and 29; attaching means 26 preferably stationarily securing press rods 27 in the tank interior and attaching means 28 preferably mounting each of press rods 29 on a vertical shaft 31 journaled respectively on upper and lower bearings 33, 35; vertical baffle elements 37 (not shown in FIG. 6) for defining vertical channels C' in cellular mass M for conducting liquid L to a lower elevation of the tank structure; and motor means 39 and power transmission means 41 for driving rotor 43 and causing rotative movement of press rods 29.

Deliquoring apparatus 11 preferably is arranged for continuous operation and preferably includes pump means 45 fitted in conduit means 47 interconnecting chemical pulping operation 13 with entry opening 21 of tank structure 15. The apparatus also preferably includes scraper means 49 and annular apron means or launder 51 arranged at the upper elevation of the tank structure for radially moving the cellular substance S as it is forced upwardly by pump means 45, and for moving the gel substance G into annular apron 51 fitted circumferentially about the upper elevation of the tank. An outlet 53 may be arranged in the bottom of annular apron 51 for conducting the cellular gel substance G away from the deliquoring apparatus.

A horizontally arranged distributor conduit 55, connected with feed conduit 57, preferably is arranged in the lower interior of tank structure 15 for uniform distribution of cellular substance S in the tank interior. The cellular substance is forcibly conducted through conduit 47 by pump means 45 and is extruded through apertures 57 of distributor conduit 55 for uniform distribution and upward movement of the cellular substance in tank 15. Entry opening 21 and distributor conduit 55 preferably are arranged at an elevation a slight distance from the bottom of tank structure 15 for providing reservoir structure in the bottom of the tank structure for containing liquid L extracted from the cellular mass M in the tank. Liquid extracted from the cellular mass drains downwardly and forms a liquid pool P in the lower elevation of the tank structure. For continuous operation of apparatus 11, a liquid line 59 preferably is provided for conducting the liquid from pool P to the chemical recovery system of the pulping operation 13. It will be understood that the line 60 conducts the soap that has been separated from the spent cooking or pulping liquor from the pulping operation.

The series of primary press rods 27 preferably are arranged in four vertical press rod rows 27a, 27b, 27c, 27d with each rod preferably being fixedly supported at its outer end portion and projecting cantilever fashion radially and upwardly toward the center axis of the tank structure. In corresponding manner, press rods 29 preferably are arranged in four vertical press rod rows 29a, 29b, 29c, 29d equiangularly arranged about rotor shaft 31 and with each press rod 29 being supported cantilever fashion on the rotor shaft and projecting downwardly and obliquely radially toward the cylindrical wall surface of the tank structure.

The press rods of each vertical row of press rods 27a, 27b, 27c, 27d; 29a, 29b, 29c, 29d respectively of the primary and secondary series of press rods 27, 29 preferably are arranged in uniform vertical incremental spacing. The press rod rows 27a, 27b, 27c, 27d; 29a, 29b, 29c, 29d intermingle upon rotation of rotor 43 and the press rods in press rod rows 29a, 29b, 29c, 29d pass successively through the spaces between adjacent stationary press rods in rows 27a, 27b, 27c, 27d.

In certain embodiments of the deliquoring apparatus (not shown) it may be desirable to arrange the primary (stationary) and secondary (movable) series or press rods respectively 27, 29 in other than vertical rows, as for example, in staggered or random circumferential arrangements without departing from the spirit and scope of the present invention.

Figure 2:
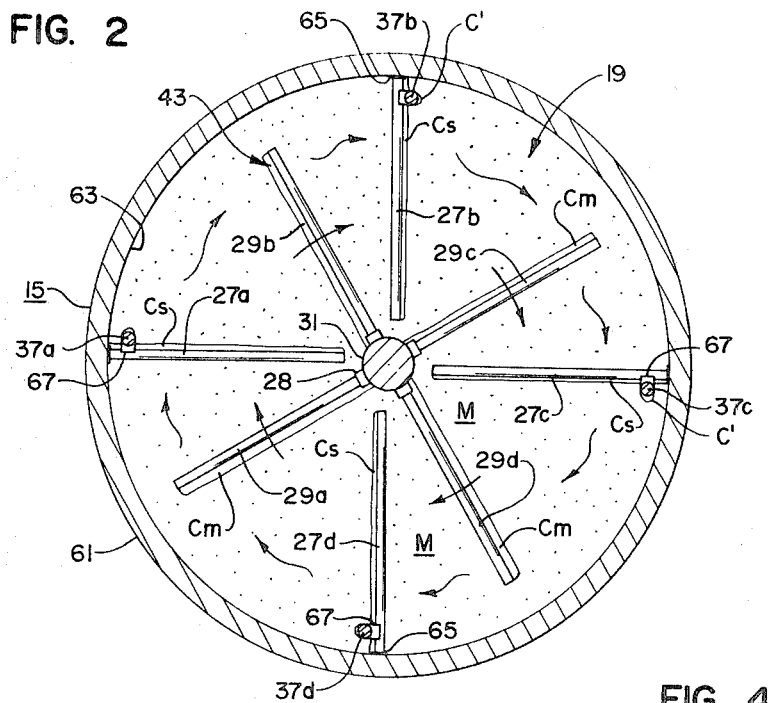
Figure 4:
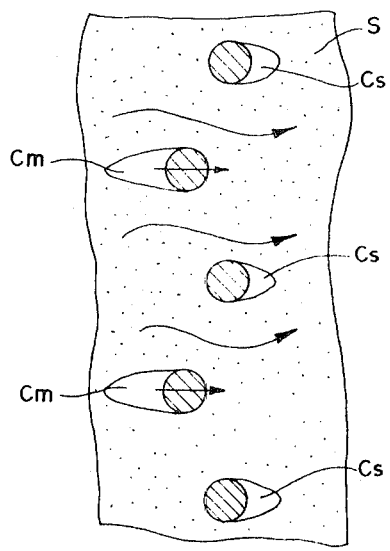
Figure 5:
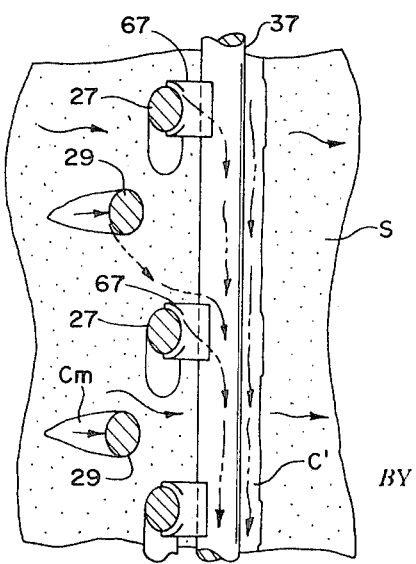

When rotor 43 is rotatively driven by motor means 39 in a circular path through the cylindrical cellular mass M of semisolid substance S, on the trailing side of each secondary press rod 29 there is formed a ductlike void or channel indicated Cm (see FIGS. 2, 4 and 5). The circular movement of rotor press rods 29 (approximately 3–5 r.p.m.) causes the cylindrical cellular mass M in the interior of the tank to turn slowly (approximately one-third to one-half r.p.m.) in the direction of rotation of rotor 43 (clockwise, as viewed in FIG. 2). The series of stationary primary press rods 27 retard the clockwise turning movement of the cellular substance mass M, and on the rearward side of each press rod 27 (rearward relative to the clockwise movement of cellular mass M) there is formed a ductlike channel Cs (see FIGS. 2 and 4). Channels Cs and Cm formed respectively on the rearward and trailing sides of press rods 27, 29 define ductway means for conducting the liquid L radially outwardly and downwardly from the center axis of the rotor and toward the cylindrical wall of tank structure 15. Rotative movement of rotor 43 and resulting rotative movement of cylindrical cellular mass M, and the head pressure or column pressure of cellular mass M at the infinite elevations of the cellular mass causes the liquid squeezed from the cellular substance and collected in channels Cs and Cm to be conducted radially along the press rods 27, 29 toward the cylindrical tank wall 61.

The vertical baffle elements, indicated generally by numeral 37, preferably are in the form of baffle rods 37a, 37b, 37c, 37d (see FIGS. 1 and 2). Each baffle rod preferably performs a two fold function in that it assists in cantilever supporting a row of stationary press rods 27a, 27b, 2c, or 27d and also defines a vertical ductway or channel C' (see FIGS. 2 and 5) for conducting the liquid substance L downwardly or toward liquid pool P. As the cellular mass is slowly turned by rotation of rotor 43, the radially outwardly moving liquid L in channels Cs and Cm will move downwardly along the surface 63 of tank wall 61 to liquid pool P (see liquid movement along wall surface 63 indicated in broken line arrows in FIGS. 1 and 3). Channels C' formed respectively by rod elements 37, preferably are utilized for increasing the rate and volume of downward movement of liquid L and in certain embodiments of the invention a greater quantity of liquid may flow downwardly through channels C' formed by baffle elements 37 than will flow downwardly along the interior surface of tank structure wall 61.

Figure 3:
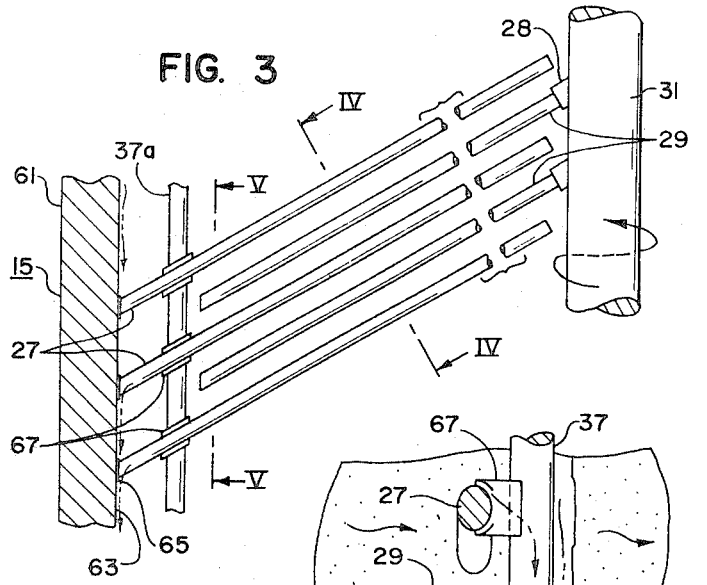

The downward proximal end portion of each stationary press rod 17 may be fixedly secured to the inner surface of tank wall 61 as indicated at numeral 65 in FIG. 3. Angle brackets 67 preferably fixedly interconnect the lower proximal end portions respectively of press rods 27 with respective baffle rods 37a, 37b, 37c, 37d. Each press rod 27 is preferably cantilever fixed on a respective baffle rod 37 and on the forward side of the press rod in relation to turning movement of the cellular mass M (see FIGS. 2, 3 and 5). Mounting each press rod on the forward side of a respective vertical baffle rod 37 permits ready movement of liquid flowing downwardly in a channel Cs along the backside of each press rod 27 to transfer to channel C' of a baffle rod 37 (see liquid flow from channels Cs to C' indicated by broken line arrows in FIG. 5).

Auxiliary press rods 27', 29' preferably are arranged respectively at the upper and lower elevations of tank interior 19. Auxiliary press rods 27', 29' each do not rely on a squeezing action of contradirectionally rotating rods 27', 29' for extracting the liquid phase L from the gel phase G as typically in the alternately arranged operative rods 27, 29. Stationary auxiliary press rods 27' arranged at the upper elevation of tank 15 removes liquid from the cellular mass M in response substantially to the turning movement only of the cellular mass. This is different from the action of a typical press rod 27 which is arranged adjacent the path of movement of a respective press rod 29 and coacts with the respective press rod 29 in squeezing the liquid L from the cellular substance. However, it will be understood that if desired, additional press rods 29 may be interposed between the upper two fixed rods 27 without departing from the spirit and scope of the present invention. In somewhat similar manner, moveable auxiliary press rods 29' arranged at the lower elevation of tank 15 function in squeezing liquid L from the cellular substance substantially only by movement of auxiliary rod 29' through the cellular substance; auxiliary rods 29' extract the liquid from the cellular mass but substantially without coaction with stationary press rods 27.

In the operation of apparatus 11 shown in FIGS. 1 and 6, the cellular substance S is forcibly moved through entry opening 21 into the lower interior of the tank structure and is moved upwardly above the pool of liquid P. During the progressive upward movement of the cellular structure S, the gel phase substance G becomes less concentrated with the loss of liquid phase substance L and is moved upwardly through the open top or gel phase exit opening 25 of the tank (see indication of movement of the gel phase substance indicated in full line arrows in FIGS. 1 and 6). Simultaneously with the upward movement of gel phase substance G, the liquid phase substance L moves downwardly in countercurrent fashion and into liquid pool P from whence it passes outwardly through liquid substance exit opening 23 (see indication of liquid flow indicated by broken line arrows in FIGS. 1 and 6).

FIG. 7 illustrates a modification 11' of the deliquoring apparatus, particularly of the vertical baffle elements 37 of the structure shown in FIGS. 2–6. In the deliquoring apparatus shown in FIG. 7, a rotor 43' is concentrically vertically journaled in tank wall structure 61'. Longitudinally extending vertical riblike baffle elements 37' (three elements 37' being shown in FIG. 7) are intermittently arranged about the inner periphery of the cylindrical tank wall 61' and may be integrally formed with the tank wall. Each of baffle elements 37' forms a vertical void or channel C'' on the rearward side respectively of each baffle element 37' corresponding substantially in function with the channel C' formed by each baffle rod 37 of the embodiment shown in FIGS. 1 and 6. Primary and secondary press rods respectively 27'', 29'' preferably are arranged in configuration corresponding with the configuration of press rods 27, 29, and for handling a substance S having a heavy liquid component L, the press rods 27'', 29'' are radially angled obliquely outwardly and downwardly from rotor shaft 31'. Stationary press rods 27'' may be cantilever fixedly supported adjacent the inner periphery of tank wall 61' as by welding as shown at 65' or by vertical baffle rod means (not shown) corresponding to the baffle rod means shown in the embodiment of FIGS. 1–6.

FIG. 8 illustrates deliquoring apparatus 11'' adapted for extracting liquid from cellular substance S or for separating the liquid and gel phases of a cellular system wherein the liquid phase is lighter in weight than the gel phase. The deliquoring apparatus 11'' is substantially an inverted arrangement of the deliquoring apparatus 11 shown in FIG. 6. Apparatus 11'' preferably includes tank structure 15'' having an entry opening 21'' arranged in the upper elevation of the tank structure and including liquid and gel phase substance exit openings 23'', 25'' arranged respectively in the upper and lower elevations of the tank structure. The apparatus 11'' includes primary and secondary series of press rods respectively 27'', 29'' coactingly operative and extending respectively upwardly and outwardly relative to the center axis of cylindrical tank 15'' and upwardly toward the level of liquid exit opening 23''. Stationary press rods 27'' are each cantilever fixedly supported adjacent the inner periphery of tank wall 61'' with each rod projecting radially downwardly and toward the center axis of the tank structure.

Apparatus 11'' preferably includes vertically extending baffle elements (not shown) corresponding substantially in structure and function to baffle elements 37 of deliquoring apparatus 11, except that in apparatus 11'' vertical baffle elements (37) assist in conducting the lighter liquid L upwardly along the tank wall interior rather than conducting the liquid downwardly as shown in FIG. 6. The series of secondary press rods 29'' are radially fixed cantilever fashion on rotor shaft 31'' which in turn is journaled respectively in upper and lower bearings 33'', 35''. A horizontally arranged scraper 49'' may be mounted on the lower end portion of shaft 31'' for radially moving the gel phase substance outwardly through exit openings 25''. Motor means 39'' connected to shaft 31'' through power transmission means 41'' drives rotor 43'' and causes relatively contradirectionally operative movement of press rods series 27'', 29''.

In the operation of the apparatus shown in FIG. 8, the heavier gel substance gravitatingly moves downwardly in tank 15 and is expelled through gel phase opening 25''. The liquid phase substance L', being displaced by the heavier gel phase substance G', moves radially outwardly and upwardly to the upper elevation of the tank structure whereat it is collected in a pool P' from whence it may be drained through exit opening 23''.

It is contemplated that certain modifications may be made to the embodiments shown respectively in FIGS. 6 and 8 and such embodiments equally applicable in an installation whereat a heavy liquor (FIG. 6) or a lighter liquor (FIG. 8) is being extracted from a gel phase substance. Although in the embodiments shown in FIGS. 6 and 8 the secondary press rods (29) are rotor mounted and are movable relative to the primary press rods (27), it is contemplated that a reversal of these actions may be had and the deliquoring apparatus constructed in such a manner that the secondary press rods 29 be stationary and the primary press rods 27 be movable. In such an arrangement, the radially outwardly diverging secondary press rods will be stationarily supported and the radially inwardly converging primary press rods may be guidingly constrained in circular movement concentrically about the center axis of the apparatus and in such a manner that the series of primary press rods (27) intermingle with the stationary secondary press rods (29). Such a reversal of parts is believed to be well within the purview of a worker in the art.

I claim:

1. Apparatus for extracting liquid from a semisolid mobile cellular substance including a liquid and a gel phase and wherein a substantial difference in density exists between the liquid and gel phases, the liquid-extracting apparatus comprising a substantial cylindrical vertical tank having upper and lower ends, means for introducing the semisolid cellular substance into the tank adjacent one of said ends thereof thereby forming substantially a cellular mass in the tank interior, liquid exit opening means arranged adjacent said one of said ends of said tank for removal of the liquid phase substance from the tank interior, gel phase exit opening means arranged adjacent the opposite end of said tank from said one of said ends for removal of the gel phase substance from the tank interior, mechanical means for accelerating the rate of separation of the liquid and gel phase substances of the cellular mass including a series of primary press rods arranged in the tank interior said rods being arranged in a plurality of vertical radially extending planes when viewed from above of the vertical axis of the tank interior and each rod being fixedly supported in cantilever fashion at its outer end portion and projecting radially toward said vertical axis of the tank at a substantial angle relative to a horizontal plane therethrough, a series of secondary press rods disposed parallel with said primary press rods and radially arranged relative to said vertical axis when viewed from above and with each press rod thereof being fixedly supported in cantilever fashion at its inner end portion on a central vertical shaft and projecting in a vertical plane radially away from said vertical axis at an angle relative to a horizontal plane therethrough, means for rotating said series of secondary press rods about said vertical axis with respect to the series of primary press rods and with the relative rotation being at least 360° and at the rate of less than 7 r.p.m. said press rods of each vertical row of press rods of said primary and secondary series of press rods being arranged substantially in uniform vertical incremental spacing and the press rod rows respectively of said primary and secondary series of press rods being relatively arranged whereat each row of one series of press rods intermittently interradially passes through respectively each row of the other series of press rods, and a plurality of long, vertical and arcuate-in-section baffle means defining vertical voids or channels in said cellular mass for conducting the liquid phase substances toward the liquid exit opening of said tank.

2. An apparatus as defined in claim 1 wherein substantially each rod of said primary and secondary series of press rods is obliquely arranged relative to a horizontal plane intersecting each rod.

3. An apparatus as defined in claim 1 wherein said series of primary press rods are arranged in a plurality of vertically aligned rows of press rods angularly spaced circumferentially about the vertical axis of said tank and wherein said series of secondary press rods are arranged in a plurality of vertically aligned rows of press rods angularly intermittently spaced circumferentially about the vertical axis of said tank.

4. An apparatus as defined in claim 1 wherein said means for introducing said semisolid cellular substance into the interior of said tank includes means defining an entry opening opening into the interior of said tank, feed conduit means for conducting said semisolid cellular substance to and through said entry opening, and force pump feed means arranged in said feed conduit means for continuously moving said cellular substance through said feed conduit means and into the interior of said tank.

5. An apparatus as defined in claim 4 wherein said entry opening for passage of the cellular substance into the interior of said tank is arranged at a lower elevation of said tank and at an elevation substantially a short distance above the elevation of the liquid phase substance exit opening of the tank, and wherein the gel phase substance exit opening is arranged at an upper elevation of said tank.